US007017157B1

(12) United States Patent
Ishioka

(10) Patent No.: US 7,017,157 B1
(45) Date of Patent: Mar. 21, 2006

(54) METHOD AND SYSTEM FOR RECORDING OPERATING SYSTEM CALL INFORMATION

(75) Inventor: Yukiya Ishioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/571,535

(22) Filed: May 16, 2000

(30) Foreign Application Priority Data

Sep. 30, 1999 (JP) .................................. 11-279515

(51) Int. Cl.
*G06F 9/00* (2006.01)
(52) U.S. Cl. .................. 718/102; 717/127; 700/32
(58) Field of Classification Search ............ 717/128, 717/127, 124; 712/227; 709/102; 700/32; 718/102, 1, 100, 101, 107, 108; 719/310, 719/317, 318
See application file for complete search history.

(56) References Cited

U.S. PATENT DOCUMENTS

| | | | | | |
|---|---|---|---|---|---|
| 4,462,077 | A | * | 7/1984 | York ........................... 714/45 |
| 5,274,811 | A | * | 12/1993 | Borg et al. ................. 717/128 |
| 5,355,487 | A | * | 10/1994 | Keller et al. ................ 717/127 |
| 5,737,521 | A | * | 4/1998 | Kleber et al. ................ 714/45 |
| 5,771,385 | A | * | 6/1998 | Harper ........................ 717/128 |
| 5,807,606 | A | * | 9/1998 | Mould et al. ................ 427/10 |
| 5,867,647 | A | * | 2/1999 | Haigh et al. ................. 713/200 |
| 6,009,270 | A | * | 12/1999 | Mann .......................... 717/128 |
| 6,047,123 | A | * | 4/2000 | Brown et al. ................ 717/127 |
| 6,049,666 | A | * | 4/2000 | Bennett et al. ............. 717/130 |
| 6,094,729 | A | * | 7/2000 | Mann .......................... 714/25 |
| 6,154,857 | A | * | 11/2000 | Mann .......................... 714/30 |
| 6,175,914 | B1 | * | 1/2001 | Mann .......................... 712/227 |
| 6,223,338 | B1 | * | 4/2001 | Smolders .................... 717/128 |
| 6,260,057 | B1 | * | 7/2001 | Eykholt et al. ............. 709/102 |
| 6,314,530 | B1 | * | 11/2001 | Mann .......................... 714/38 |
| 6,351,844 | B1 | * | 2/2002 | Bala ........................... 717/128 |
| 6,421,738 | B1 | * | 7/2002 | Ratan et al. ................. 719/328 |
| 6,513,155 | B1 | * | 1/2003 | Alexander et al. .......... 717/124 |
| 6,546,548 | B1 | * | 4/2003 | Berry et al. ................. 717/128 |
| 6,553,564 | B1 | * | 4/2003 | Alexander et al. .......... 717/128 |
| 6,631,423 | B1 | * | 10/2003 | Brown et al. ................ 719/323 |
| 6,647,491 | B1 | * | 11/2003 | Hsu et al. .................... 712/237 |

* cited by examiner

*Primary Examiner*—John Follansbee
*Assistant Examiner*—Haresh Patel
(74) *Attorney, Agent, or Firm*—Staas & Halsey LLP

(57) ABSTRACT

The present invention is implementing high efficiently traces of system calls for calling inner processing of an operation systems (OS) in an information processing device acting by an operating system. It comprises recording method recording traces of system calls in an information processing device, comprising a valid/invalid of the trace function being set plural system calls by each system call, and the traces are implemented by combination of the setting functions.

3 Claims, 7 Drawing Sheets

METHOD AND SYSTEM FOR RECORDING OPERATING SYSTEM CALL INFORMATION

CROSS REFERENCE TO RELATED APPLICATIONS

The contents of Japanese Patent Application No. 279515/99, filed Sep. 30, 1999 in Japan, are incorporated herein by reference.

BACKGROUND OF THE INVENTION

1. Field of the Invention

The present invention relates to a system call information recording method, recording means and recording units of a recording device in a information processing device, which works with an operating system and comprises plural system calls for calling processes within operating the system.

2. Back Ground of the Related Art

An information process device which works by using an operating system (OS) has a sub routine, called a system call, so that an application program works by using OS function calls the OS functions. Application program designers make an application program by using system calls for a control of a device, or a control of data in the program and process.

There is an information device, in which a system call traces functions, to record ways or orders which have called the system call, and is included to confirm the action of the user program or to investigate program operations and failures, and to confirm the action of the program in debug working in cases of bad actions.

In the prior art, when recording program working by the system trace functions, only an instruction action which validates or invalidates the system trace function, or only an instruction action which starts or ends the system trace working, is supported.

When using the system trace function of the prior art, all system trace results are recorded as data called in what is usually a log which records trace results. Because of this, when a user gets necessary information from the log, acting that the user investigates the necessary results by visual inspection, and picks up only necessary results, or acting that based on all the result in the log, necessary results are picked up by using tools having search functions etc., are necessary in each time of the system trace.

Also, keeping enough recording area in the information processing device using the trace functions for storing all the trace results is necessary, and for this, regions proportional to the number of calls made by the application program while the system trace function is valid is necessary, so that keeping very large storage area is necessary.

SUMMARY OF THE INVENTION

An object of the present invention is to realize recording methods, recording devices of the method and recording units such that, when a user investigates the log of the trace result, user's operation for picking up the necessary information or using a tool for extracting the necessary information is not necessary.

Another object of the present invention is to realize the recording method and recording device of the recording method such that unnecessary information is not recorded, and that memory region, which was big in the prior art, is reduced.

Another object of the present invention is to realize the recording method and recording device of the method that setting all system calls is capable and that data are exchangeable with previously stored data.

Another object of the present invention is to realize the recording method and recording device of the method that the selection of the system call for tracing system trace is implemented only by selection of valid/invalid for the setting term, and that, even when recording of many system calls are necessary, selecting terms are reduced by setting necessary group term and easy.

The system calls of the present invention are grouped by process functions in the OS, and each group is recorded in a mode of each group which determines whether to record the system for call information or not. Moreover for each system call, the system call is to be set in a mode recording the system call information or not. Also it is set whether the system call trace function is valid or not. Or it is set a mode whether the system call trace function is valid or invalid. Further for all the system calls, it is set a mode whether records the system call information or not.

One embodiment of the present invention is a system call information recording method of an information processing device, which works by an operating system and comprises plural system calls calling processes in the operating system. The present invention comprises following steps. A first step decides, when the system call occurs, whether the system call trace function is valid or not. Further, a second step decides, when the system call function is decided as valid in the first step, whether a system call group in which the system call belongs is set in a mode for recording the system call information or not, and when the recording mode is set, transferring to recording action. The third step deciding by each, when the system call group is not set in the recording mode, deciding whether the system call is set in a mode recording the system call information, and when the system call is set in the recording mode, transferring to the recording action.

Another embodiment of the present invention is a system call information recording method of an information processing device, which works by an operating system and comprises plural system calls calling processes in the operating system. The present invention comprises a first step deciding, when the system call occurs, whether the system call trace function is valid or not. A second step decides, when the system call is decided as valid in the first step, whether a mode recording all system calls information is set or not, and when the recording mode is set, transferring to the recording action. A third step, when the mode recording all system calls information is not decides, deciding whether the system call group in which the system call belongs is set in a mode recording the system call information, and when the recording mode is set, transferring to recording action. A fourth step decides by each, when the system call group is not recorded in the recording mode in the third step, whether the system call is set in a mode recording the system call information or not, and when the recording mode is set, transferring to the recording action.

Another embodiment of the present invention is a system call information recording device in a information processing device, which works by an operating system and comprises plural system calls calling processes in an operating system. The present invention comprises the following. A first unit decides, when the system call occurs, whether the system call trace function is valid or not. A second unit decides, when the system call function is decided as valid by the first unit, whether a system call group in which the system call belongs is set in a mode recording the system call information or not, and when the recording mode is set, transferring to recording action. A third unit decides by each group, when the system call group is not set in the recording mode, whether the system call is set in a mode recording the system call information, and when the system call is set in the recording mode, transferring to the recording action.

Another embodiment of the present invention is a system call information recording device in a information processing device, which by an operating system and comprises plural system calls calling processes in an operating system. The present invention comprises following. A first unit decides, when the system call occurs, whether the system call trace function is valid or not. A second units decides, when the system call is decided valid in the first unit, whether a mode recording all system calls information is set or not, and when the recording mode is set, transferring to the recording action. A third unit decides by each, when the mode recording all system calls information is not decided, whether the system call group in which the system call belongs is set in a mode recording the system call information, and when the recording mode is set, transferring to recording action. A fourth unit decides by each, when the system call group is not recorded in the recording mode in the third step unit, whether the system call is set in a mode recording the system call information or not, and when the recording mode is set, transferring to the recording action.

Another embodiment of the present invention is a system call information recording device in a information processing device, which works by an operating system and comprises plural system calls calling processes in an operating system. The present invention comprises following. A first unit decides, when the system call occurs, whether the system call trace function is valid or not. A second unit decides, when the system call function is decided valid in the first unit, whether a system call group in which the system call belongs is set in a mode recording the system call information or not, and when the recording mode is set, transferring to recording action. A third unit decides by each, when the system call group is not set in the registering mode, whether the system call set in a mode recording the system call information, and when the system call is set in the registering mode, transferring to the recording action.

Another embodiment of the present invention is a system call information recording device in a information processing device, which by an operating system and comprises plural system calls calling processes in an operating system. The present invention comprises following units. A first unit decides, when the system call occurs, whether the system call trace function is valid or not. A second unit decides, when the system call is decided valid at in the first unit, whether a mode recording all system calls information is set or not, and when the recording mode is set, transferring to the recording action. A third unit decides by each, when the mode recording all system calls information is not decided, whether the system call group in which the system call belongs is set in a mode recording the system call information, and when the recording mode is set, transferring to recording action. A fourth unit decides by each, when the system call group is not recorded in the recording mode in the third unit, whether the system call is set in a mode recording the system call information or not, and when the recording mode is set, transferring to the recording action.

BRIEF DESCRIPTION OF THE DRAWINGS

FIG. 6 shows an example of components of a trace setting register Of.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
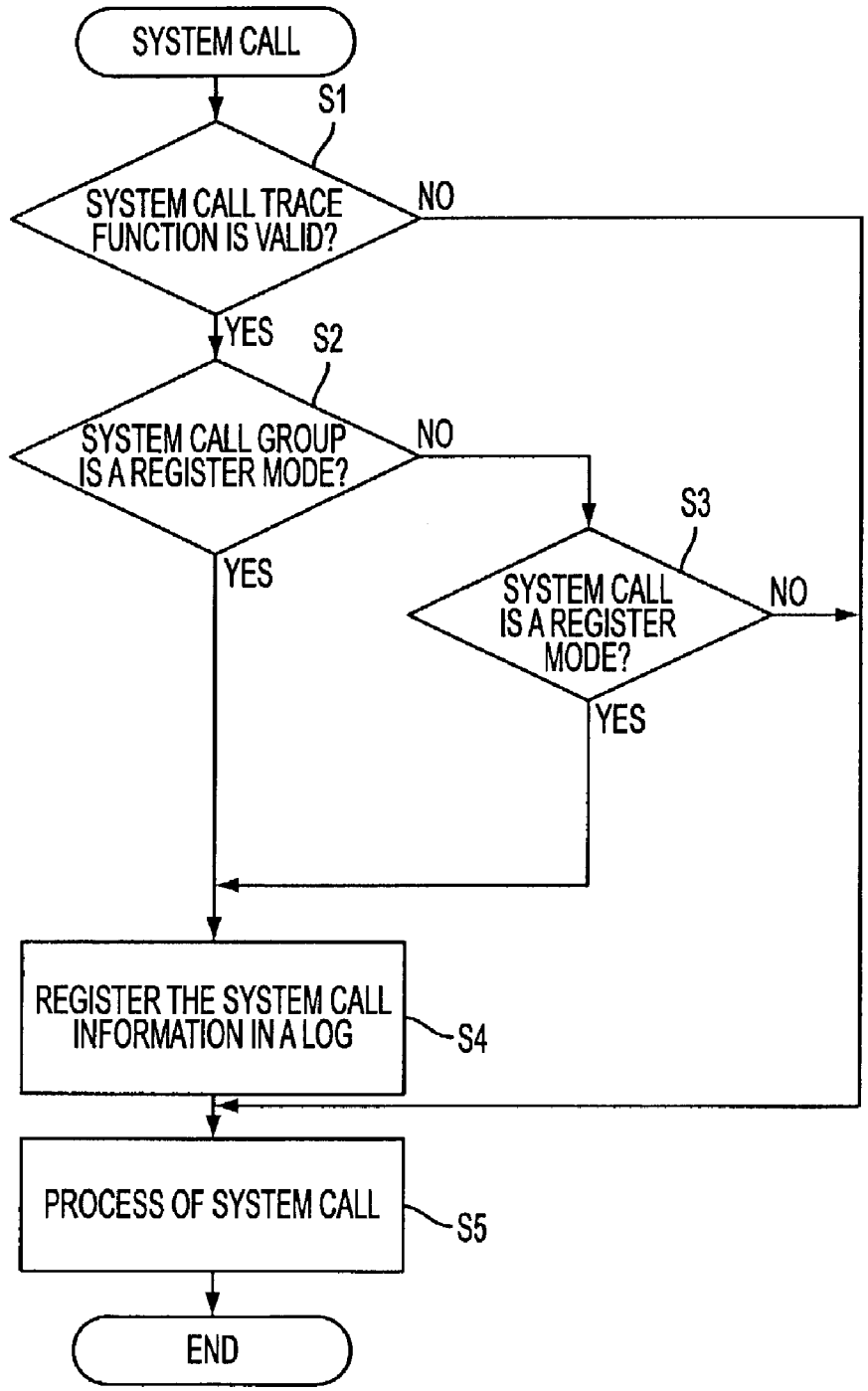
FIG. 1 shows a recording method of a system call of the first embodiment of the present invention.

FIG. 1 shows a system call information recording method by the first embodiment of the present invention.

In the components of FIG. 1, a step (S1) decides, when the system call occurs, whether the system call trace function is valid or not, a step(S2) decides, when the system call function is decided valid in the first step, whether a system call group in which the system call belongs is set to a mode recording the system call, and when the recording mode is set, transferring to recording working, and a step (S3) decides by each, when the system group is not set in the registering mode at the step 2, whether the system call is in a mode recording the system call information or not, and when being set in a mode recording, transferring to recording action.

The step S4 is a step recording the system call information into the log, and the step S5 is a step processing system call.

When, in the step S1, the system call trace function is decided to be invalid when the system call occurs, the system call information is not recorded in the log, and in the step 5, the system call process is implemented. Like this, when the recording mode of the system call is invalid in step S3, without recording the system call information in the log, the system call process is implemented in step S5.

Figures 2, 3:
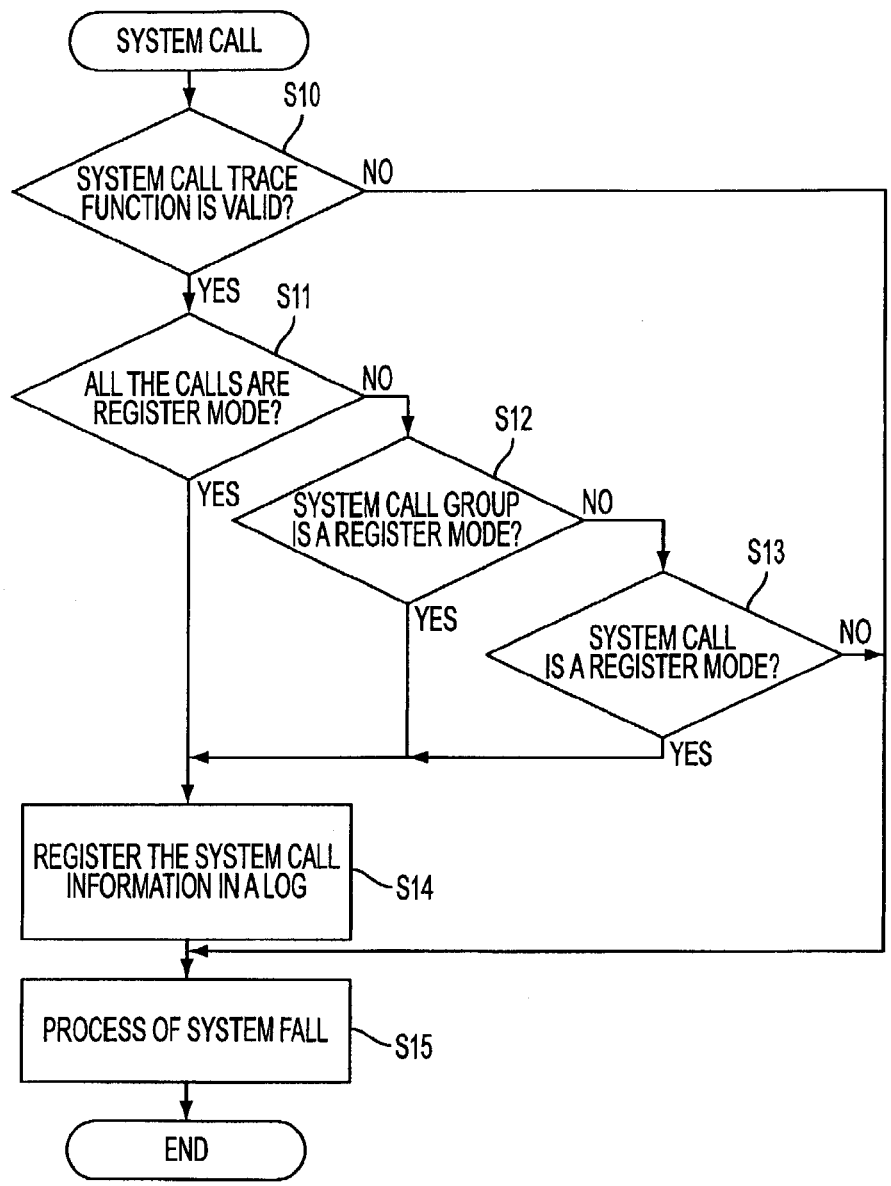
FIG. 2 shows a recording method of a system call of the second embodiment of the present invention.
FIG. 3 shows divided groups of system calls of the first embodiment.

FIG. 2 shows a system call information recording method by the second embodiment of the present invention.

In the embodiment in FIG. 2, a step (S10) deciding, when the system call occurs, whether the system call trace function is valid or not, a step (S11) deciding, when the system call function is decided valid in the first step, whether all the system calls are register mode or not, and when the recording mode is set, transferring to recording action, and a step (S12) deciding, when decided the mode recording the information of all the system call, whether system call group in which the system call belongs is set in a mode recording the system call information or not, and when the recording mode is set, transferring to the recording action, and a step (S13) deciding by each system call, when the mode recording the system call information is not set in the step S12, whether the system call is set in a mode recording the system call information or not, and when the recording mode is set, transferring to the recording action. The S14 is a step recording the system call information into the log, and the step S15 is a step processing system call.

When, in the step S10, the system call trace function is invalid, the system call information is not recorded in the log, and the system call process is implemented in the step 15. Like this, when the recording mode of the system call is invalid in the step 13, without recording the system call information in the log, the system call process is implemented in step S15.

Implement Mode of the Present Invention

FIG. 3 shows the group division of system call of the first embodiment of the present invention.

The system calls a–h are divided into a group A of the system calls a–d, and the group B of the system calls e–h.

Figure 4:
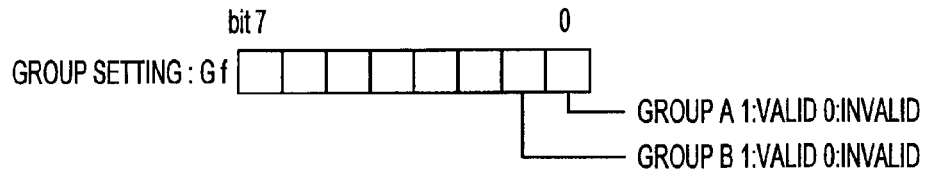
FIG. 4 shows an example of components of a group setting register Gf.

FIG. 4 shows an example of a group setting register Gf for setting valid/invalid of the system trace function for each group. The bit 0 of Gf shows valid/invalid of the group A, the bit 1 shows valid/invalid of the group B.

Figure 5:
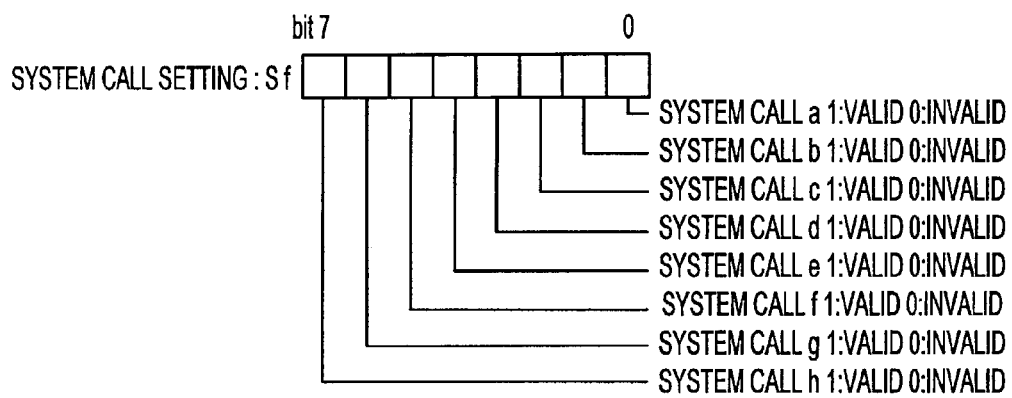
FIG. 5 shows an example of components of a system call setting register Sf.

FIG. 5 shows an example of a system call setting register Sf for setting validity/invalidity of the system trace function for each system call. The bit 0 of Sf shows valid/invalid of the system call a, the bit 1 shows valid/invalid of the system call b, like this the last bit 7 shows valid/invalid of the system call h.

Figure 6:
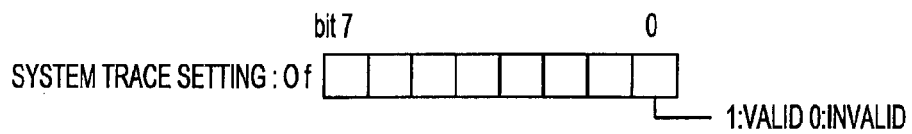

FIG. 6 shows an example of a system trace setting register Of for setting validity/invalidity of the total system trace call. The bit 0 of the Of shows valid/invalid of the total system call trace function.

Figure 7:
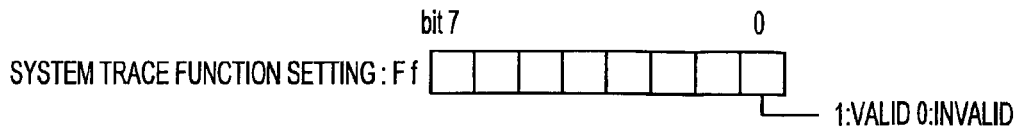
FIG. 7 shows an example of components of a system trace function setting register Sf.

FIG. 7 shows an example of a system trace setting register Ff for setting validity/invalidity of the total system trace call. The bit 0 of the Ff shows valid/invalid of the total system call trace function.

The above mentioned each of the register Gf, Sf, Of and Ff are stored in a memory, and used by being read from the memory at each deciding process.

Figure 8A:
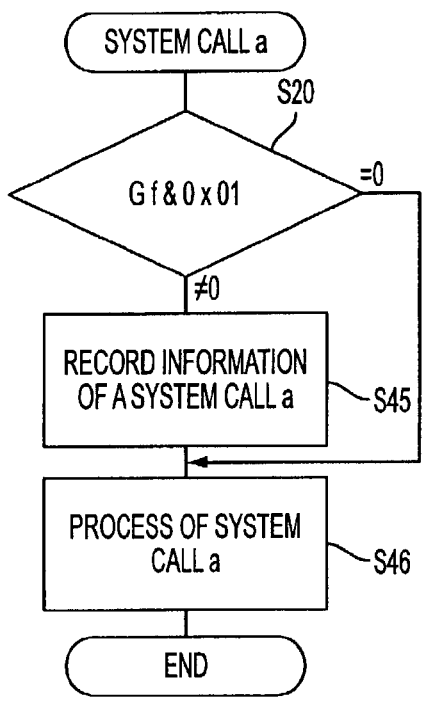
FIG. 8 (*a*) and FIG. 8 (*b*) show an embodiment of decision of existence or no-existence of the log action by contents of a group setting register Gf.
Figure 8B:
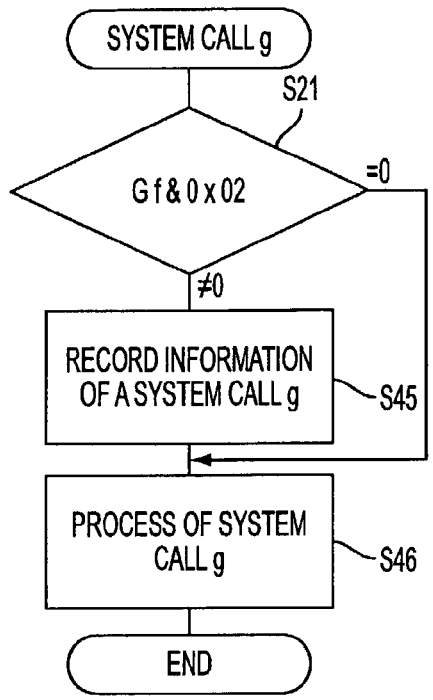

FIGS. 8 (*a*) and (*b*), show examples of deciding the validity/invalidity of recording the log information by contents of the group setting register Gf.

When validity/invalidity of the system call is decided by the set value of the group recording register Gf, for example in a case validating a group A, "0X01" is set in the Gf register. When validating a group B, "0X02" is set in the system group register Gf. The "0X02" shows hexadecimal notation. When the system call a–d (the group A) is called, a logic product of the group code "0X01" and the set value in the Gf register is calculated to decide whether the system call group A is valid or invalid, and the validity or invalidity of the group A is decided by the calculated value.

When the system call e–h (the group B) is called, a logic product of the group code "0X02" of the system call e–h and the set value in the Gf register is calculated to decide whether the system call is valid or invalid, and the validity or invalidity of the group B is decided by the calculated value.

FIGS. 8 (*a*) shows an action that a system call a is called in the case of the valid of the group B. Actions are same in cases that another system calls are called.

Now, supposing "0X02" for validating the group B in the group setting register Gf. In this condition, as shown in FIG. 8 (*a*), when the system call a (or any one of a–d) belonging to the group A is called, in the step 20, a product of the Gf (="0X02") and the system call group code "0X01" is calculated to be "0", and the process branches to the step 46. So the recording the system call information in the log is not occurred, and in step 46, the process of the system call a is implemented. The logic product is calculated with the same bit position values between the two bit groups.

FIG. 8(*b*) shows an embodiment that a system call g is called in a case of the validation of the group B. Another cases that the system calls e,f,h are called are same actions. "0X02" for validating the group B is set in the Gf register. The system call g belongs in the group B of which group code is "0X02", so that the product of the Gf (=0X02) and the group code B ("0X02") is calculated to be "#0" in the step S21, so that the process branches to the step 45. So the system call g is recorded in the log in the step 45, and in the step S46, the process of the system call g is implemented.

Figure 9A:
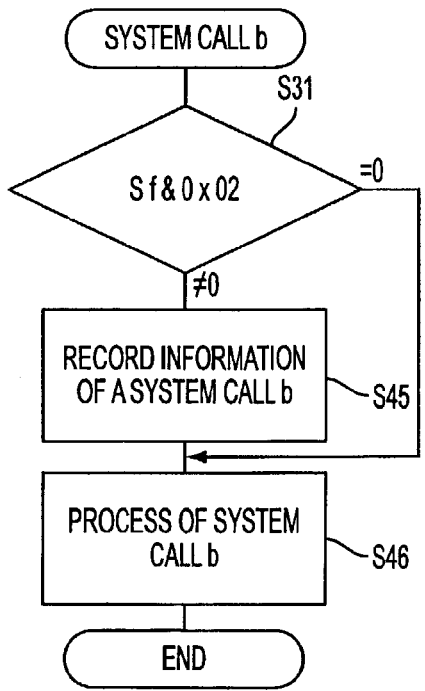
FIG. 9 (*a*) and FIG. 9 (*b*) show an embodiment of decision of existence or no-existence of the log action by contents of a system call setting register Sf.
Figure 9B:
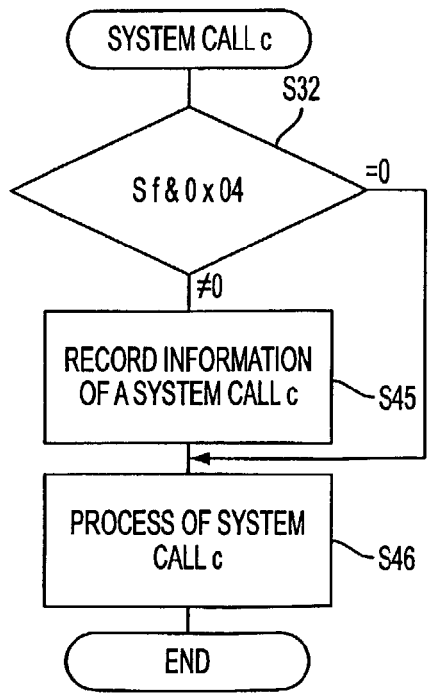

FIGS. 9 (*a*) and (*b*) show embodiments that the validity or invalidity of recording the log information of the system call is decided by using the setting value in the register Sf. FIGS. 9 (*a*) and (*b*) show cases that "0Xaa" (binary number of 10101010) is set in the Sf register. In this case, the system calls a,c,e, and g are invalid, and system calls of b,d,f and h are valid (see FIG. 5).

FIG. 9 (*a*) shows a case of the system call b. The other system calls, system call d,f and h, is same.

FIG. 9 (*a*) shows a case that the system call b is called by the application program, the logic product of the Sf (=0Xaa) and the individual code "0X02" of the system call b is calculated to be "0X02" in the step S31, and the process branches to the step S45, so that the log information of the system call b is recorded in the log in the step S45, and the process of system call b is implemented in the step S46.

FIG. 9 (*b*) shows a case of the system call c. The other system calls, system call a,e,g, are like.

The product of the Sf (=0Xaa) and the individual code "0X04" of the system call c is calculated to be "0" in the step S32, and the process branches to the step S46. So the process of the system call is implemented in the step 46, without recording the log information of the system call.

Figure 10:
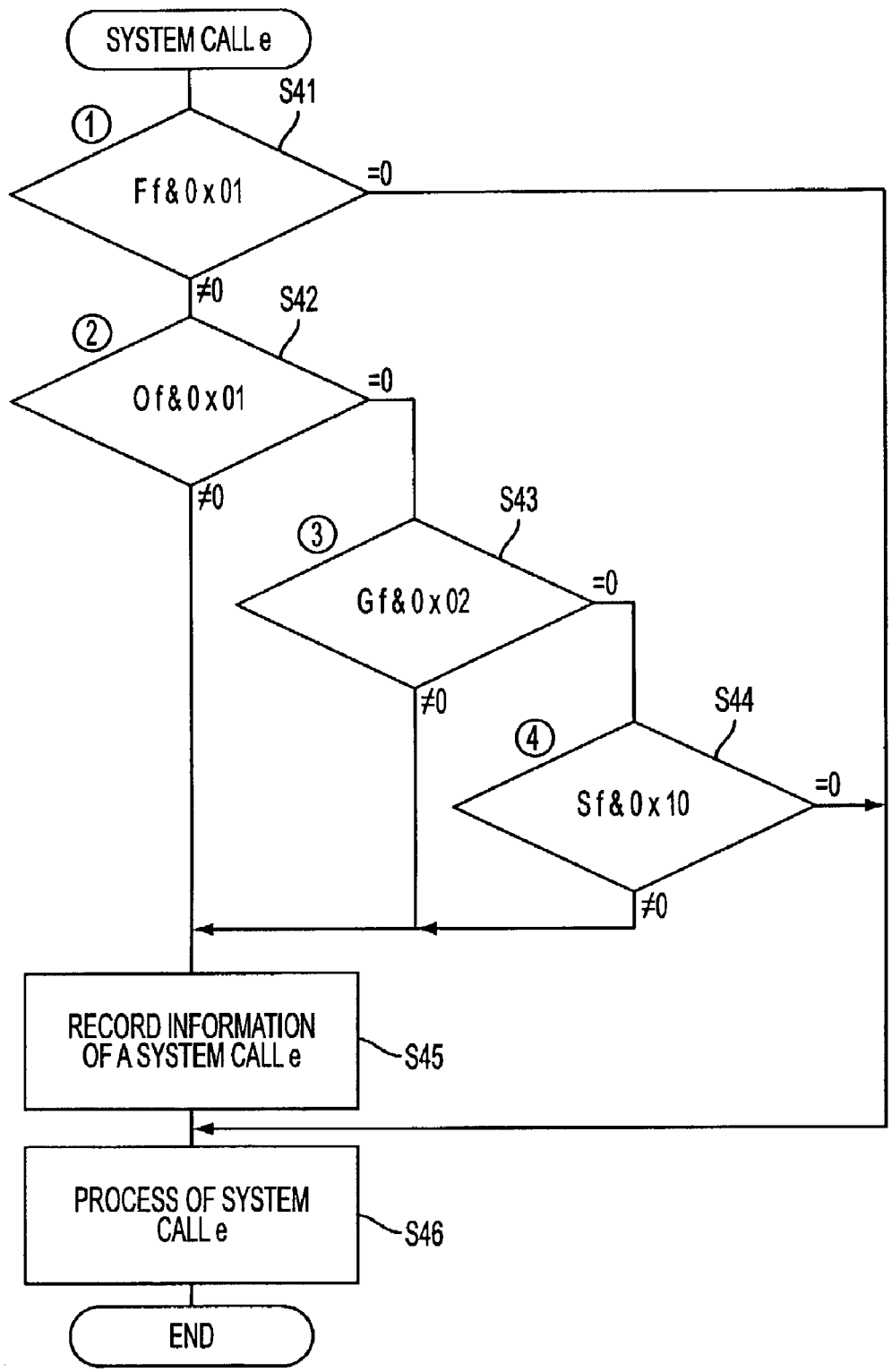
FIG. 10 shows an embodiment of the first example of the present invention.

FIG. 10 shows an example using all of the system trace function setting register Ff, the system trace setting register Of, the group setting register Gf and the system call setting register Sf.

When invalidating the system trace function in itself, "0X00" is set in the Ff register. On the other hand, When validating the system trace function, "0X01" is set in the Ff register. When a system call (any one of system calls a–h is like) is called, the product of the "0X01" in the Ff register and the fixed value of "0X01", which is set for deciding the validity or invalidity of the system trace function in itself, is calculated.

FIG. 10 shows an embodiment deciding the validity/invalidity of recording the log information of system call e. The other cases of system call a,b,c,d,f,g and h are like.

When setting "0X00" for invalidating the system trace function in itself in the Ff register, the product of the Ff (="0X00") and the fixed value of "0X01" is calculated to be "0" in the step S41, so that the process branches to the step S46. So the process of the system call e is processed in the step S 46 without another deciding process (S42, S43, S44) and the recording process of the log information in the log (S45).

On the contrary, when setting "0X01" for validating the system trace function in the Ff register, and the system call e(any one of a–h) is called, the product of the Ff "0X01" and the fixed value "0X01" is calculated to be "0X01" in the step S41. So the process goes to the step S42. The step 42 calculates the product of the recorded value of the Of register and a fixed value of "0X01", which is set for deciding the validity/invalidity of the trace of all system calls. when setting "0X00" for validating the trace of all system calls in the system trace setting register Of, the product of the Of (="0X01") and the fixed value "0X01", which is set for deciding the validity/invalidity of the trace of all system calls, is calculated to be "0X01" in the step S42, and the process branches to the step S45. So the log information of the system call e is recorded in the log (S45), and the process of the system call e is implemented in step S46.

On the other hand, when "0X00" for invalidating the trace of all system calls is set in the Of register, the product of the Of (="0X00") and the fixed value "0X01" is calculated to be "0" in the step S42, and the process branches to the step S43.

At the step S43, when "0X02" (validating the trace of the system call of group B) is set in the Gf, the product of the Gf and the group identifying code "0X02" of the system call e is "≠0", and the process branches to the step S45, and the information of system call e is recorded in the log in the step S45, and the process of the system call e is implemented in the step S46.

At step 43, when "0X01" (validating the trace of the group A) is set, a product of the Gf and the group identifying code "0X02" of the system call e is "=0". So the process branches to the step S44.

At the step S44, when a code of which bit 4 position is "1" in the Sf register is set, the product of the value of the Sf register (in the following it explained as "Sf") and the individual identifying code "0X10" of the system call e is "≠0", so that the process branches to the step S45. So the information of system call e is recorded in the log, and the process of the system call e is implemented in the step 46.

On the other hand, at step 44, when a code not containing "1" in a position of bit 4 of the Sf register is set, the product of the Sf and the individual identifying code "0X10" of the system call e is "=0", so that the process branches to "=0". Further the system call process of the system call e is implemented in the step S46, without recording the log information of the system call e in the step S45.

As another example of the present invention, components which has not the deciding step S42 in the example of FIG. 10 is accepted. In this case, when the step S41 decides "≠X0" in the step S41, the process goes directly to the step S43.

Also a system call information recording device is realized by comprising process units which implements each deciding step S41–S44 shown in FIG. 10. In this case, components which has not a deciding process unit corresponding to the process of the step 42 is capable as another embodiment.

Figure 11:
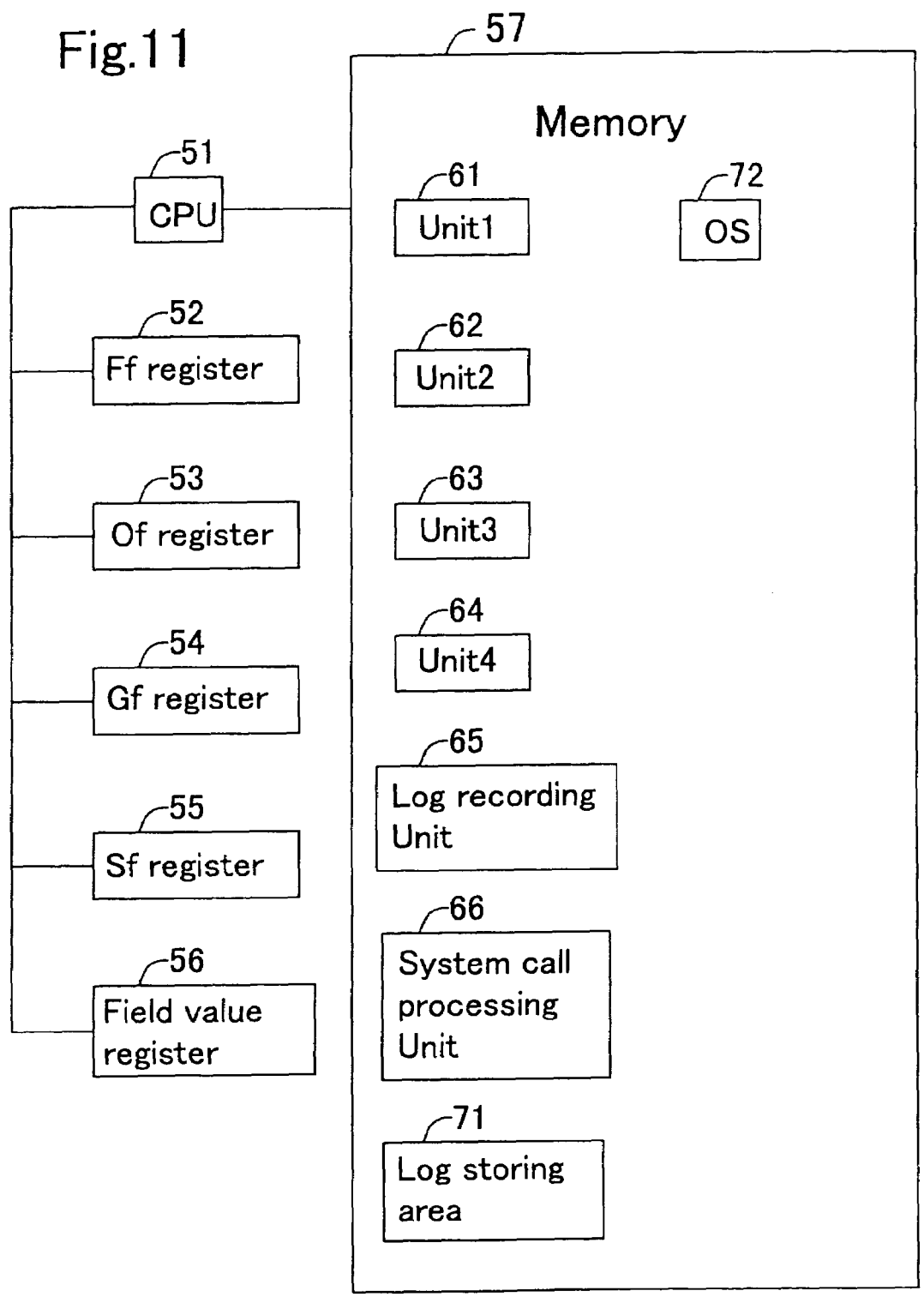
FIG. 11 shows an embodiment of structural architecture of the present invention.

FIG. 11 shows an example of structural architecture of the present invention.

In FIG. 11, a reference number 51 is a CPU 52 is the Ff register, in which, for example, "1" is set in the bit 0 position for validating unconditionally the system trace function in itself. Further "0" is set in the 0 bit position for invalidating the system trace function (see FIG. 7).

53 is an Of register, in which "1" is set in the 0 bit position for validating the trace of all system calls, and "0" is set in the 0 bit position for invalidating unconditional all system call trace, that is, to decide the validity/invalidity of the trace of the group call or each system call)(see FIG. 6).

54 is a Gf resister, in which "1" is set in 0 bit position for validating the trace of the system call of the group A, "0" is set in 0 bit position for validating the trace of the system call of the group A (see FIG. 4). Further, "1" is set in bit 1 position for validating the trace of the system call of the group B, "0" is set in bit 1 position for validating the trace of the system call of the group B (see FIG. 4).

55 is a Sf register, in which a value for deciding valid/invalid of each system call. For example, "1" is set in bit 0 position of the Sf register for validating the trace of the system call a, and "0" is set in bit 0 position of the Sf register for validating the trace of the system call a. Moreover "1" is set in bit 1 position of the Sf register for validating the trace of the system call b, and "0" is set in bit 1 position of the Sf register for validating the trace of the system call b.

Like this, "1" or "0" is set in the bit 3 position, bit 4 position, bit 5 position, bit 6 position, bit 7 position and bit 8 position for validating or invalidating each the system call c, system call d, system call e, system call f, system call g and system call h (see FIG. 6).

56 is a fixed value register in which a fixed value (0X01) is stored. The fixed value is used for deciding the validity/invalidity of the system trace function in itself with the Ff register, and for deciding the trace of all systems calls with the Of register.

57 is a memory.

61 is a unit 1, which decides the validity/invalidity of the system trace in itself.

62 is a unit 2, which decides the validity/invalidity the trace of all system calls.

63 is a unit 3, which decides the validity/invalidity of the trace of the group A or group B.

64 is a unit 4, which decides the validity/invalidity of the trace of each system call.

65 is a log recording unit, which records the log information of a system call in a log recording area 71.

66 is a system call processing unit, which implements the system call.

71 is a log recording area, in which the log information is recorded.

72 is an OS.

FIG. 11 shows the units 1–4, the log recording unit and the system call processing unit are loaded in the memory 57.

Figure 12:
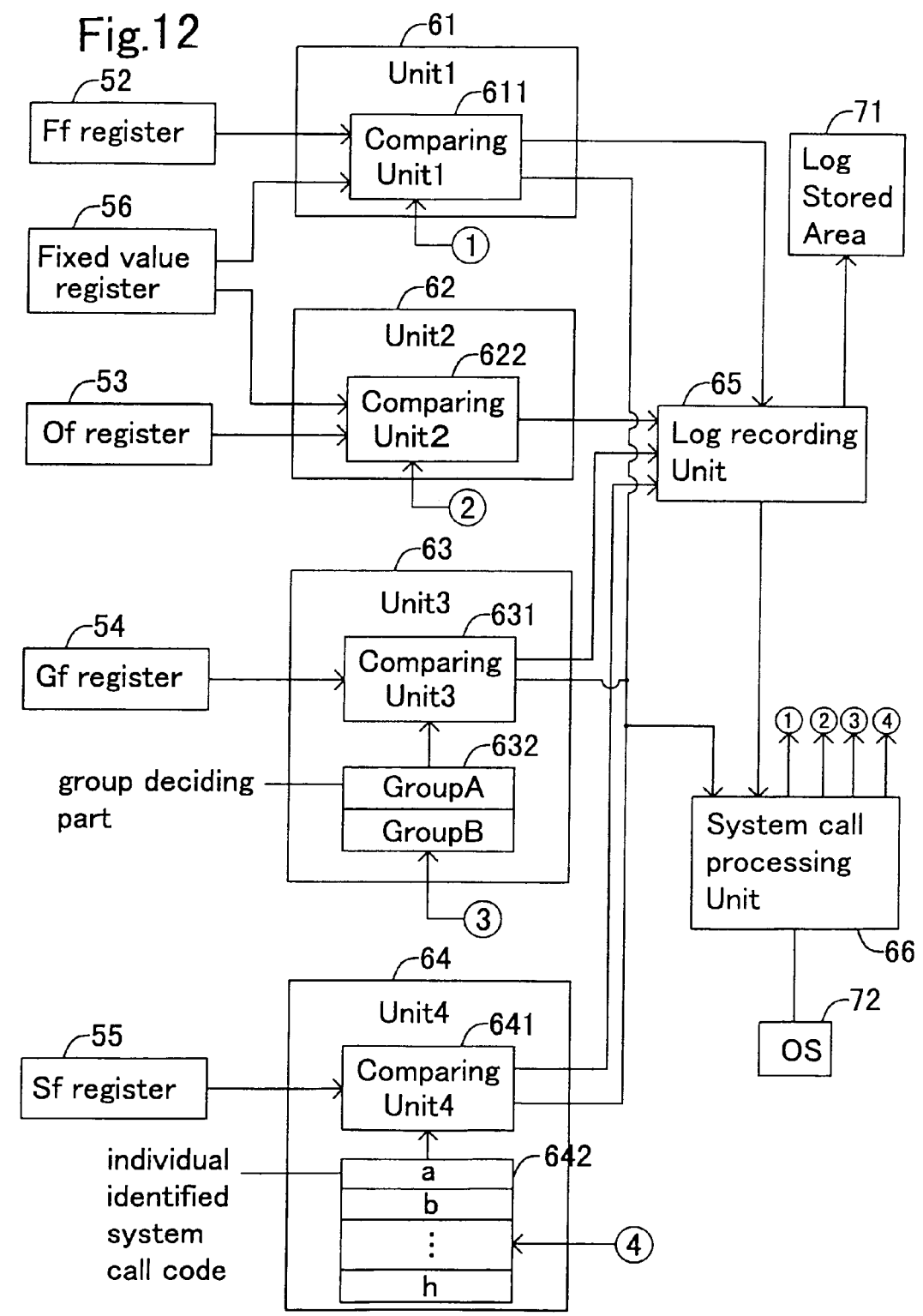
FIG. 12 shows block diagram of components and relation of elements in FIG. 11.

The action of FIG. 11 is explained by referencing FIG. 12.

FIG. 12 shows the components and relations of each unit. In FIG. 12, same reference number shows same part.

In the unit 1, 611 is a comparing unit 1, which compares a set value in the Ff register 52 to a value of the fixed value resister 56, when deciding validity/invalidity of the system trace function is directed.

622 is a comparing unit 2, which compares a set value in the Of resister 53 to a value of the fixed value register 56, when deciding validity/invalidity of the trace of all system calls is directed.

631 is a comparing unit 3, which compares a value of the G register 54 and a group code of the group A or group B, when deciding validity/invalidity of the trace of a system call a of the group A or group B.

632 is a group deciding part, which decides a group belonging to a given system call, and sends the decided group code to the comparing unit 3(631).

641 is a comparing unit 4, which compares a value of the Sf register, 55 and a individual system code of a given system call, when deciding validity/invalidity of the trace of each system call.

642 is an individual identified system call code deciding part, which decides which one of the system calls a,b,c,d, e,f,g and h is called, and sends the individual identified system call code of the decided system call.

Actions of the components of FIG. 12 is explained.

The system call unit 66 sends a direction of the decision validating/invalidating the system trace function in itself to the comparing unit 1(61). The comparing unit 1 compares the set value of the Ff register 52 to the set value (0X01) of the fixed value register 56 by calculating the logic product etc. When a value of the bit "0" position of the Ef register 52 is 1, the logical product is "0", so that the comparing unit 1(611) directs to process the system call to the system call processing part 66 without recording the log information.

The system unit 2(62) decides the validtity/invalidity of the trace of the all system call, when receiving the validation of the system trace function. The comparing unit 2(622) compares a set value of the Of register 53 to the set fixed value of the fixed value register 56 by calculating a logic product etc. When a value of the bit 0 position of the Of register 53 is "1", the logic product is "0", so that the comparing unit 2 (622) directs recording the log information of the system call to the log recording unit 65. The log recording unit 65 records the log information of the called system call into the log recording area 71. Further the system call processing unit implements the system call. On the other hand, when a value of the bit 0 position of the Of register 53 is "0", the logic product is "0", so that the comparing unit 2 (622) directs deciding the validity/invalidity of the trace of the system call group to the unit 3(63).

When receiving the invalidation of the trace of all system calls, the unit 3(63) compares a set value of the Gf register 54 and a group code of a system call sent from the group deciding part 632.

When the system call belongs to the group A, the group code A and a value of a bit 0 position of the Gf register 54 are compared. When the system call belongs to the group B, the group code B and a value of a bit 1 position of the Gf register 54 are compared.

For example, when the trace of a system call of the group A is valid, and a called system call belongs to the group A, the comparing result of the value of the 0 bit position of the Gf register 54 to the group code A is 0, so that the comparing unit 631 directs recording the log information to the log recording unit 65. The log information recording unit 65 records the log information of the called system call into the log information recording area 71. Further the system call processing unit 66 implements the system call. On the other hand, when the value of the bit 0 position of the Gf register 54 is 0, which invalids the trace of the group A, the comparing result is 0. So the comparing unit 3 (631) informs recording the log information of the system call of the group is invalid to the unit 4(64).

Further when a system call belongs to the group B, the comparing unit 3 (63) compares the value of the bit 1 position of the Gf resister 54 to the group code B. The comparing method is same with the compare of the group A, so that the explanation is neglected.

When the unit 4(64) receives the information of the invalid of the trace of the group from the unit 3 (63), the comparing unit 4(644) compares the value set in the Sf register 55 to the identified code of the system call. For example, the individual identified code of the system call a,b,c,d are each 0X01, 0X02, 0X04, 0X08. Further, the identified code of the system call e,f,g,h are each 0X10, 0X20, 0X40, 0X80.

For example, when a value 0Xaa (10101010) is set in the Sf register, and a system call a is called, the logical product of the identified code (0X01) of the system call a and the value (0Xaa) in the Sf register 55 is calculated. In this case, the logical product is "0", so that the system call of the log information is not recorded, and the system call is processed in the system call processing unit 66. Further, when the system call b is called, a product of the identified code (0X02) of the system call b and the value (0Xaa) of the Sf register 55 is calculated. The result of the calculation is not 0, so that the comparing unit 4(642) directs recording the log information of the system call b to the log information recording part 65, and the log information recording part 65 records the log information of the system call b into the log recording area 71. Further, the individual system call processing unit 66 implements the system call b. Processes of another system calls are implemented like this, that is, a logic product of each identified code and the value of the Sf register 55, and when the value of the product is not 0, the comparing unit 642 directs recording the log information of the system call to the log information recording part 65, and the log information recording part 65 records the log information of the system call. Further the system call processing part 66 implements the system call b.

Another system calls (system call c,d,e,f,g, and h) are processed with same action, that is, calculating the logical product of the identified code of the system call and the value of Sf register 65, when the product is not 0, the comparing unit 642 direct recording the log information of the system call to the log recording unit 65, and the log recording unit records the log information. Further, the system call processing unit 66 implements the system call. When the product is 0, the comparing unit 642 direct the process of the system call to the system call processing unit 66, and the system call processing unit 66 processes the system call.

According to the present invention, users can use the trace function as a targeting system call which users intend to know the trace result, so that when users investigate the log information of the trace result, users' working for picking up necessary information or using a tool for extracting the necessary information, which are problems in prior art, are not necessary. Also as unnecessary information is not recorded, memory regions, which were big in prior art, are reduced largely.

Moreover, as setting so as to trace all like the prior art, data exchangeability with data stored already is capable.

The selection of the system call for implementing the system trace is made only by a selection of valid/invalid for a setting items, and even when recording of many system calls are necessary, selecting terms are reduced by setting necessary group items and the setting is easy.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A system call information recording method by an information processing device, which works by an operating system and comprises plural system calls calling processes in the operating system, the operating system stored in the recording device of the information processing device, comprising:

storing one or more plural system call groups, each of the system call groups including plural system calls grouped by a process function for the system calls;

deciding whether a system call trace function is valid or not, when a system call occurs;

deciding whether a mode recording the system calls information is set or not, when the system call is decided valid; recording information of the system call in a log of the recording device, when the mode recording the system calls information is set;

deciding by each of the system calls, whether a mode recording the system call information by the system call group in which the system call belongs is set or not set, when the mode recording the system calls information is not set; recording information of the system call in the log, when the mode recording the system call group is set;

deciding by each of the system calls, whether a mode recording the system call information by the system call selected to record the system call information is set or not set, when the system call group is not set recorded in the recording mode; and recording information of the system call in the log, when the mode recording the system call is set, otherwise not recording the system call information of the system call;

wherein, the plural system call groups are grouped by process functions, respectively, and each of the system call groups including the plural system calls, and the system calls in selected system call groups are recorded in the log of the recording device.

2. A system call information recording device in an information processing device, which works by an operating system and comprises plural system calls calling processes in the operating system, the operating system stored in the recording device, comprising:

storing means for storing one or more plural system call groups, each of the system call groups including plural system calls grouped by a process function for the system calls, first means for deciding whether a system call trace function is valid or not, when a system call occurs;

second means for deciding whether a mode recording the system calls information is set or not, when the system call is decided valid in the first means; the second means recording information of the system call in a log of the recording device, when the mode recording the system calls information is set;

third means for deciding by each of the system calls, whether a mode recording the system call information by the system call group in which the system call belongs is set or not set, when the mode recording the system calls information is not set in the second means; the third means recording information of the system call in the log, when the mode recording the system call group is set; and fourth means for deciding by each of the system calls, whether a mode recording the system call information by the system call selected to record the system call information is set or not set, when the system call group is not set recorded in the recording mode in the third unit; and the fourth unit recording information of the system call in the log, when the mode recording the system call is set, otherwise the fourth unit not recording the system call information of the system call;

wherein, the plural system call groups are grouped by process functions, respectively, and each of the system call groups including the plural system calls, and the system calls in selected system call groups are recorded in the log of the recording device.

3. A system call information recording device in an information processing device, which works by an operating system and comprises plural system calls calling processes in the operating system, the operating system stored in the recording device, comprising:

storing unit for storing one or more plural system call groups, each of the system call groups including plural system calls grouped by a process function for the system calls;

first unit for deciding whether a system call trace function is valid or not, when a system call occurs;

second unit for deciding whether a mode recording the system calls information is set or not, when the system call is decided valid in the first unit; the second unit recording information of the system call in a log of the recording device, when the mode recording the system calls information is set;

third unit for deciding by each of the system calls, whether a mode recording the system call information by the system call group in which the system call belongs is set or not set, when the mode recording the system calls information is not set in the seconds unit; the third unit recording information of the system call in the log, when the mode recording the system call group is set; and fourth unit for deciding by each of the system calls, whether a mode recording the system call information by the system call selected to record the system call information is set or not set, when the system call group is not set recorded in the recording mode in the third unit; and the fourth unit recording information of the system call in the log, when the mode recording the system call is set, otherwise the fourth unit not recording the system call information of the system call;

wherein, the plural system call groups are grouped by process functions, respectively, and each of the system call groups including the plural system calls, and the system calls in selected system call groups are recorded in the log of the recording device.

* * * * *

UNITED STATES PATENT AND TRADEMARK OFFICE
CERTIFICATE OF CORRECTION

PATENT NO.        : 7,017,157 B1                                              Page 1 of 1
APPLICATION NO.   : 09/571535
DATED             : March 21, 2006
INVENTOR(S)       : Yukiya Ishioka It is certified that error appears in the above-identified patent and that said Letters Patent is hereby corrected as shown below:

Column 12, line 40, Change "seconds" to -- second --

Signed and Sealed this

Nineteenth Day of December, 2006

JON W. DUDAS
*Director of the United States Patent and Trademark Office*